(12) United States Patent
King et al.

(10) Patent No.: US 10,919,694 B2
(45) Date of Patent: Feb. 16, 2021

(54) WELDED DECK SEAM SKIN PONTOON INTERNAL FLOATING ROOF

(71) Applicant: HMT LLC, The Woodlands, TX (US)

(72) Inventors: Richard Paul King, Magnolia, TX (US); Michael Joseph Kaminski, Cypress, TX (US); Timothy Kyle Johnston, Houston, TX (US)

(73) Assignee: HMT LLC, The Woodlands, TX (US)

( * ) Notice: Subject to any disclaimer, the term of this patent is extended or adjusted under 35 U.S.C. 154(b) by 298 days.

(21) Appl. No.: 15/796,492

(22) Filed: Oct. 27, 2017

(65) Prior Publication Data
US 2018/0118452 A1 May 3, 2018

Related U.S. Application Data

(60) Provisional application No. 62/414,543, filed on Oct. 28, 2016.

(51) Int. Cl.
*B65D 88/34* (2006.01)
*B23K 37/02* (2006.01)
*B23K 101/12* (2006.01)

(52) U.S. Cl.
CPC .......... *B65D 88/34* (2013.01); *B23K 37/0217* (2013.01); *B23K 2101/12* (2018.08)

(58) Field of Classification Search
CPC .... B65D 88/34; B65D 88/36; B23K 37/0217; B23K 2101/12; E04H 7/00; E04H 7/065; E04H 7/02; E04B 1/3211; E04B 1/1903; F16B 2200/506; F16B 2200/509; B63B 3/48; B63B 3/52; B63B 35/34; E04C 3/02

USPC .................................................. 220/216, 218
See application file for complete search history.

(56) References Cited

U.S. PATENT DOCUMENTS

| | | | | |
|---|---|---|---|---|
| 4,993,350 A | * | 2/1991 | Pepper | B63B 1/121 114/267 |
| 5,509,562 A | * | 4/1996 | Jolly | B65D 88/34 220/216 |
| 5,704,509 A | * | 1/1998 | Rosenkrantz | B65D 88/34 220/216 |

(Continued)

*Primary Examiner* — Robert Poon
(74) *Attorney, Agent, or Firm* — Fletcher Yoder, P.C.

(57) ABSTRACT

An internal floating roof for a storage tank includes a rim, a first plurality of girders, including a first girder, a second plurality of girders, including a second girder, a deck sheet, a first cap channel, a second cap channel, and a pontoon coupled to the first girder. The first plurality of girders extend in a first direction across the rim, wherein the first plurality of girders comprises a first girder. The second plurality of girders extend in a second direction, cross-wise to the first direction. The deck sheet is disposed on a first top surface of the first girder and a second top surface of the second girder. The first cap channel is coupled to a first top channel of the first girder. The first cap channel comprises a first foot configured to press a first edge of the deck sheet against the first top surface of the first girder. The first foot is welded to the deck sheet along a first length of the first cap channel. The second cap channel is coupled to a second top channel of the second girder, wherein the second cap channel comprises a second foot configured to press a second edge of the deck sheet against the second top surface of the second girder. The second foot is welded to the deck sheet along a second length of the second cap channel.

15 Claims, 7 Drawing Sheets

(56) References Cited

U.S. PATENT DOCUMENTS

| | | | | |
|---|---|---|---|---|
| 6,126,115 | A * | 10/2000 | Carrier | B64G 1/641 |
| | | | | 244/137.4 |
| 8,650,827 | B2 * | 2/2014 | Givoni | E04C 2/543 |
| | | | | 52/588.1 |
| 2003/0163966 | A1 * | 9/2003 | Reynolds | E04B 1/3211 |
| | | | | 52/461 |
| 2004/0188438 | A1 * | 9/2004 | King | B65D 88/36 |
| | | | | 220/218 |
| 2009/0223957 | A1 | 9/2009 | Doxey et al. | |
| 2012/0211490 | A1 * | 8/2012 | Su | B65D 88/34 |
| | | | | 220/216 |
| 2014/0230363 | A1 * | 8/2014 | Tak | E04B 1/1903 |
| | | | | 52/831 |
| 2017/0159313 | A1 * | 6/2017 | Kissell | E04B 1/1903 |

* cited by examiner

WELDED DECK SEAM SKIN PONTOON INTERNAL FLOATING ROOF

CROSS REFERENCE TO RELATED APPLICATION

This application claims priority to and benefit of U.S. Patent Application No. 62/414,543, entitled "WELDED DECK SEAM SKIN AND PONTOON INTERNAL FLOATING ROOF," filed Oct. 28, 2016, which is herein incorporated by reference in its entirety.

BACKGROUND

The present disclosure relates generally to internal floating roofs for liquid storage tanks. More specifically, the present disclosure relates to techniques for reducing emissions from liquid storage tanks having internal floating roofs.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Above ground storage tanks are frequently used to store industrial quantities of a variety of raw and finished materials. These storage tanks may contain liquids, gases, solids, or some combination thereof and are used in a variety of industries. For example, the oil and gas industry frequently uses above ground storage tanks to store refined hydrocarbon products. Additionally, above ground storage tanks are also common in the petrochemical, pharmaceutical, cosmetics, food, and consumer products industries.

A variety of storage tanks may be used across all industries. For example, a storage tank may be cylindrically shaped with a fixed roof. The fixed roof, as opposed to an open top storage tank (e.g., a hopper), has the benefit of minimizing evaporation of liquid product in the tank. Moreover, a fixed roof limits contamination of the stored product by keeping foreign matter (e.g., water, dust, etc.) out of the tank.

An internal floating roof (i.e., a roof that floats on the surface of the stored product as a level of the stored product rises and falls) may further reduce emissions of the storage tank. Conventional floating roofs include panels that are affixed to pontoons and bolted together, forming bolted seams. However, liquid, gas, or fluid vapor may pass through bolted seams in the internal floating roof.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In a first embodiment, an internal floating roof for a storage tank includes a rim, a first plurality of girders, including a first girder, a second plurality of girders, including a second girder, a deck sheet, a first cap channel, a second cap channel, and a pontoon coupled to the first girder. The first plurality of girders extend in a first direction across the rim, wherein the first plurality of girders comprises a first girder. The second plurality of girders extend in a second direction, cross-wise to the first direction. The deck sheet is disposed on a first top surface of the first girder and a second top surface of the second girder. The first cap channel is coupled to a first top channel of the first girder. The first cap channel comprises a first foot configured to press a first edge of the deck sheet against the first top surface of the first girder. The first foot is welded to the deck sheet along a first length of the first cap channel. The second cap channel is coupled to a second top channel of the second girder, wherein the second cap channel comprises a second foot configured to press a second edge of the deck sheet against the second top surface of the second girder. The second foot is welded to the deck sheet along a second length of the second cap channel.

In another embodiment, system includes a girder, a first deck sheet, a second deck sheet, and a cap channel. The girder includes a first top channel extending in a first direction inward from a top surface of the girder and extending in a second direction along a first length of the girder. The first deck sheet is disposed on the top surface of the girder and on a first side of the first top channel. The second deck sheet is disposed on the top surface of the girder and on a second side of the first top channel. The cap channel includes a first leg and a second leg defining a bottom channel, a first foot configured to capture the first deck sheet against the top surface of the girder, wherein the first foot is welded to the first deck sheet, a second foot configured to capture the second deck sheet against the top surface of the girder, wherein the second foot is welded to the second deck sheet, and a first arm and a second arm, wherein the first and second arms define a first roller recess, a second roller recess, and a second top channel. The first and second legs are configured to be inserted into the first top channel of the girder and to receive a fastener.

In a further embodiment, a method of assembling a floating internal roof, includes assembling a rim, installing a first plurality of girders extending across the rim in a first direction, installing a second plurality of girders, wherein the second plurality of girders extend in a second direction, cross-wise to the first direction, and wherein the second plurality of girders extend between the first plurality of girders, positioning a plurality of deck sheets on top of the first plurality of girders and the second plurality of girders, installing a plurality of cap channels, comprising coupling a first cap channel of the plurality of cap channels to a respective girder or the first plurality of girders or the second plurality of girders, wherein a first foot of the first cap channel is configured to capture a first deck sheet of the plurality of deck sheets against a top surface of the respective girder, and welding the first foot to the first deck sheet.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more elements. The terms "comprising," "including," and "having" are intended to be inclusive and mean that there may be additional elements other than the listed elements.

The disclosed techniques include an internal floating roof for a storage tank having welded deck seams. The internal floating roof includes a rim and a plurality of girders coupled to one another in a pattern interior of the rim. A plurality of pontoons may be coupled to the girders to provide buoyancy for the internal floating roof, thereby enabling the internal floating roof to float on a surface of the product in the storage tank. A plurality of deck sheets or deck skins may be positioned on top of the girders such that the edges of the deck sheets extend substantially parallel to a top channel of respective girders. A cap channel may be inserted into the top channel of each of the respective girders and secured via one or more bolts. The cap channel includes feet that contact the edges of the deck sheets, thereby sandwiching the deck sheets between the feet of the cap channel and the top surface of the respective girder. A welding machine may then engage with the cap channel to align itself and weld the deck sheet to the cap channel. The welded seam creates a partially, substantially, or completely fluid-tight and/or air-tight seal that restricts the flow of product or product vapor through the floating roof, thus reducing product emissions through the roof relative to a floating internal roof with bolted deck seams.

Figure 1:
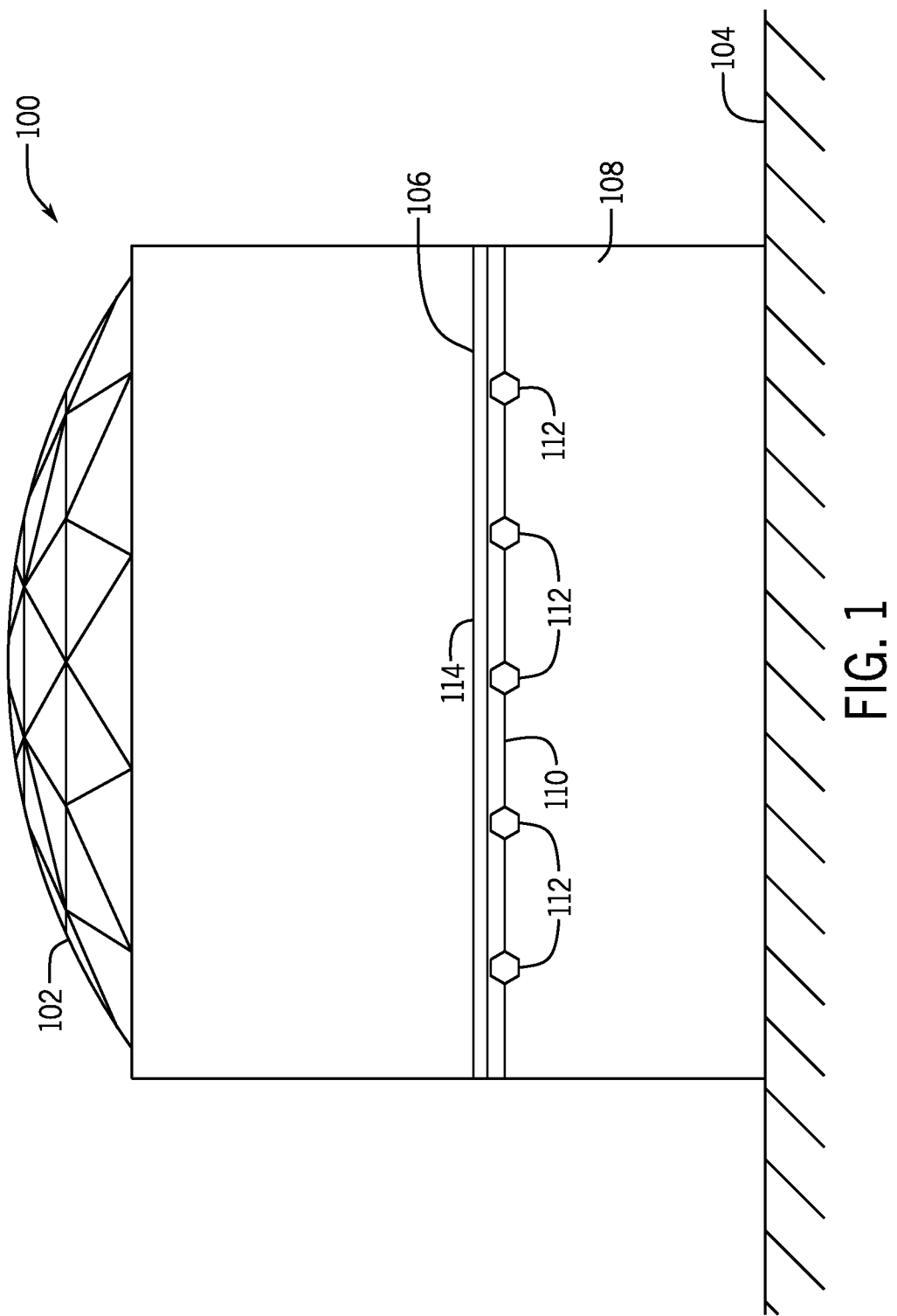
FIG. 1 is a side view of a storage tank, in accordance with an embodiment of the present disclosure.

Referring now to FIG. 1, a side view of a storage tank 100 is shown. The storage tank 100 may be a cylindrical storage tank with a dome roof 102. Though the dome roof 102 is shown in FIG. 1, it should be understood that the disclosed techniques may be used in other applications (e.g., flat roofs). In the illustrated embodiment, the storage tank 100 is positioned on a surface 104 (e.g., a concrete foundation, the ground, a structural base, etc.) and is equipped with an internal floating roof 106. The storage tank 100 may contain some type of material or product 108. The product 108 may be hydrocarbons, synthetic chemicals, water, or any other type of substance capable of being stored in the storage tank 100. Moreover, the product 108 may be a gas, liquid, solid, or some combination thereof (hereinafter referred to generally as "fluid"). Additionally, the storage tank 100 may also include other additional components that are not shown in FIG. 1.

As illustrated, the floating roof 106 includes a support structure 110, a plurality of floatation devices (e.g., pontoons 112), and a plurality of deck sheets 114. As is described in more detail below, the support structure 110 may include a plurality of support members (e.g., girders) arranged in a pattern (e.g., a grid pattern). Each of the plurality of pontoons 112 may be coupled to the support structure 110. The buoyancy of the pontoons 112 enables the floating roof 106 to float on the surface of the product 108. The plurality of deck sheets 114 may be coupled to the top of the support structure 110 (e.g., via a clamped or bolted interface). Each of the plurality of deck sheets 114 may be welded along seams (e.g., edges between adjacent skins) in order to reduce emissions of the product 108 through the floating roof 106. For example, the deck sheets 114 may only be coupled to the support structure 110 via a bolted interface (e.g., bolted deck seams), the bolted interface may not be air-tight and/or fluid-tight. As such, product 108 vapor may travel through the floating roof 106. Welding the deck sheets 114 (e.g., welded deck seams) may make the interface between the deck sheets 114 and the support structure 110 partially, substantially, or completely air-tight and/or fluid-tight. Accordingly, welded deck seams restrict the flow of product 108 vapor through the floating roof, resulting in reduced emissions.

Figure 2:
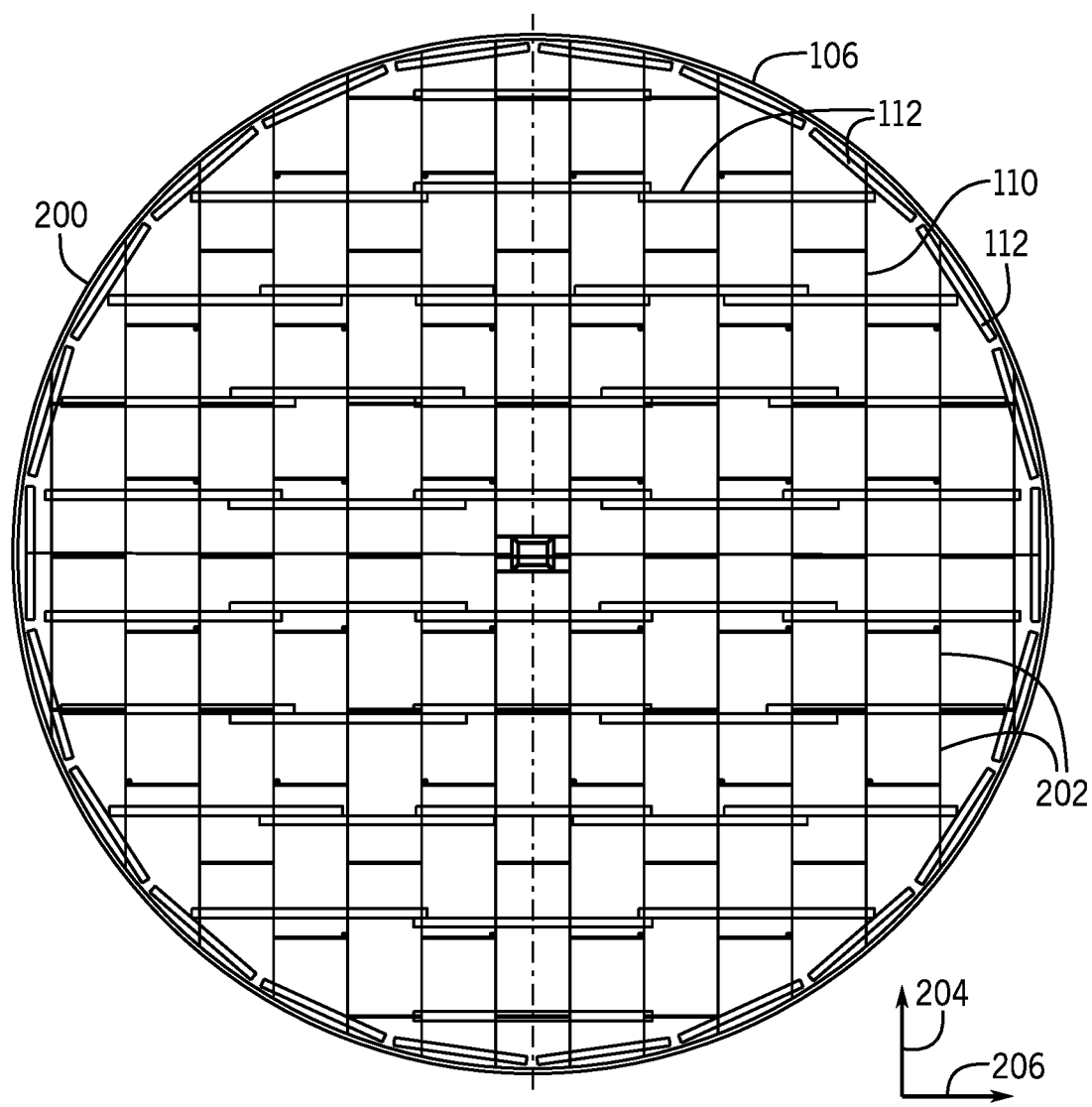
FIG. 2 is a top view of a floating roof of the storage tank of FIG. 1, in accordance with an embodiment of the present disclosure.

FIG. 2 is a top view of the floating roof 106 of FIG. 1. As shown, a rim 200 defines an outer circumference of the floating roof 106. The rim 200 may include, for example, one or more members (e.g., extruded aluminum support members) coupled to one another and forming the outer circumference of the floating roof 106. A plurality of girders 202 may be coupled to the rim 200 and to one another (e.g., via brackets) to form the support structure 110. In the illustrated embodiment, the girders 202 are arranged in a generally grid-like pattern. For example, a first plurality of girders 202 may be arranged end-to-end, spanning across the rim 200 in a first direction 204, and second plurality of girders 202 may be arranged in a second direction 206, perpendicular to the first direction 204, and offset from one another, spanning between adjacent sets of the first plurality of girders 202. However, in other embodiments, the girders 202 may be arranged in different patterns, perpendicular or oblique to one another. For example, the girders 202 may connect to one another to form triangles, pentagons, hexagons, octagons, or some other polygon.

The pontoons 112 may be coupled to the rim 200 and/or the girders 202 to provide buoyancy for the floating roof 106, allowing the floating roof 106 to float on the surface of the product in the tank. In the illustrated embodiment, a first plurality of pontoons 112 are disposed end to end circumferentially about the interior of the rim 200. A second plurality of pontoons 112 are coupled to the girders 202. The second plurality of pontoons 112 are generally aligned with the second direction 206 and arranged offset from one another in the first direction 204 such that the ends of adjacent pontoons 112 overlap with one another.

Figure 3:
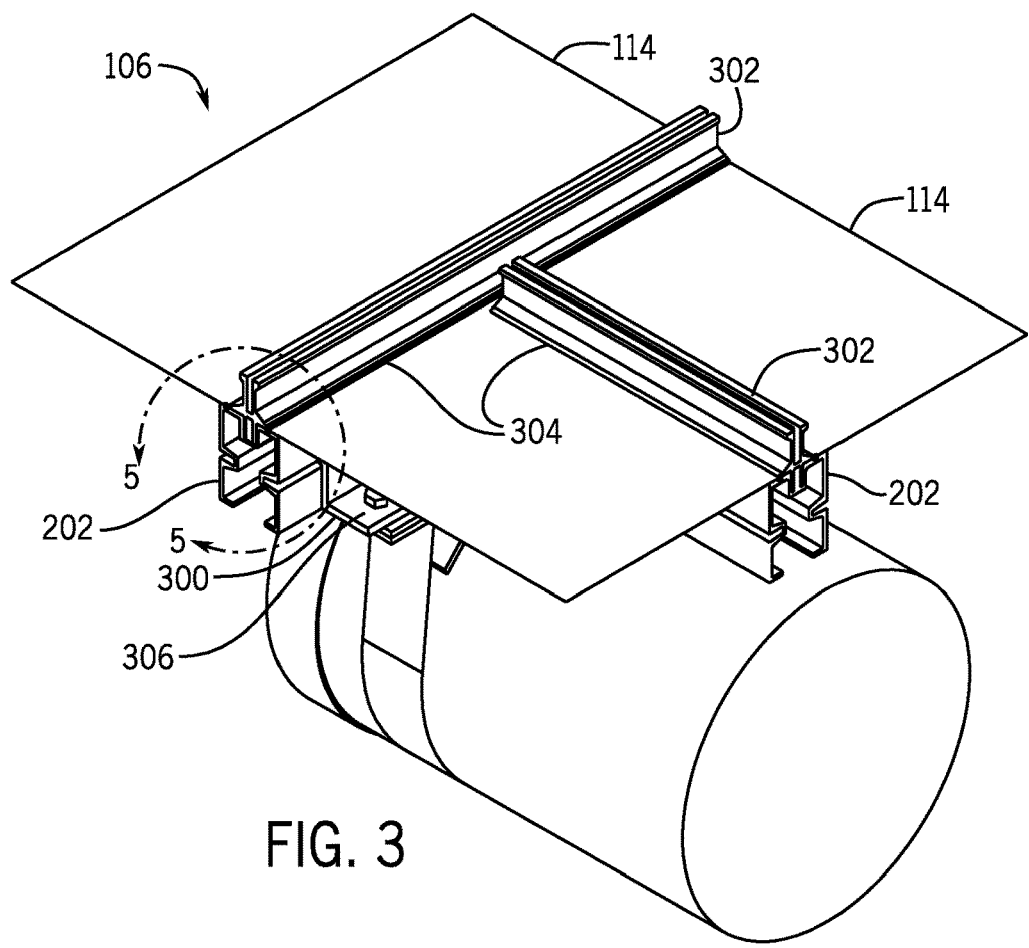
FIG. 3 is a perspective section view of a portion of an embodiment of the floating roof of FIG. 2, in accordance with an embodiment of the present disclosure.

FIG. 3 is a perspective section view of a portion of an embodiment of the internal floating roof 106 of FIG. 2. As illustrated, first and second girders 202 are disposed substantially perpendicular to one another (e.g., held in place by a bracket). The deck sheets 114 are disposed on top of the girders 202. First and second cap channels 302 couple to the girders 202 via a bolted interface and capture the deck sheets 114 by capturing the edges of the deck sheets 114 against top surfaces of the girders 202. A weld bead 304 is formed at the interface of the cap channel 302 and the deck sheets 114, forming a fluid-tight or air-tight seal between the cap channels 302 and the deck sheets 114, thereby resulting in welded deck seams. The partially, substantially, or completely fluid-tight or air-tight seal between the cap channels 302 and the deck sheets 114 may restrict the flow of product through the floating roof 106, thus reducing emissions across the floating roof 106. As illustrated, a pontoon strap 306 couples the pontoon to the girders 202 via a bracket 300.

Figure 4:
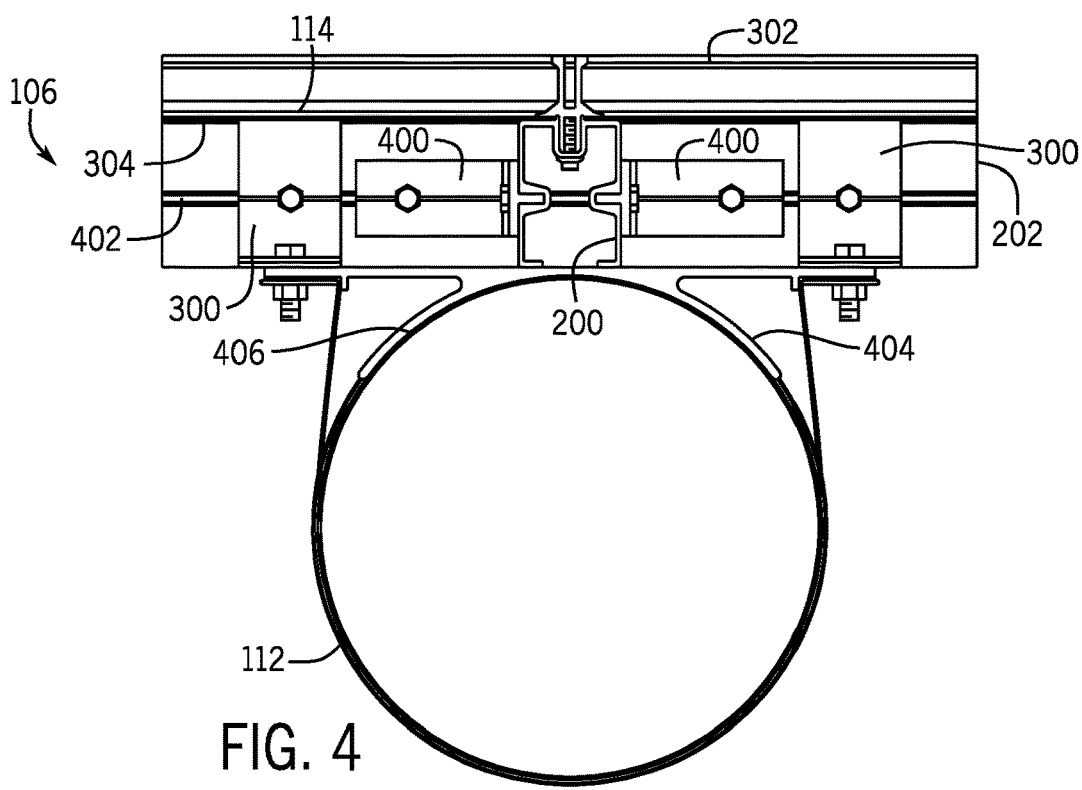
FIG. 4 is a side section view of the floating roof of FIG. 3, in accordance with an embodiment of the present disclosure.

FIG. 4 is a side section view of the internal floating roof 106 of FIG. 3. As illustrated, the girders 202 are coupled to one another via L-shaped brackets 400. The brackets 400 couple to the girders 202 via bolts that extend through the brackets 400 and interface with a respective side channel 402 of each girder 202. Similarly, the brackets 300 that couple the pontoon 112 to the girders 202 also couple to the girders 202 via bolts that extend through the brackets 300 and interface with the side channels 402 of the girders 202. As shown, the pontoon strap 306 extends around the pontoon 112 and couples to the brackets 300 coupled to the girders 202 on either side of the pontoon 112. As shown, in some embodiments, a pontoon saddle 404 may couple to the girders 202 via the brackets 300 and hold the pontoon 112 in a desired position relative to the girders 202. For example, the pontoon saddle 404 may include an arc 406 that abuts and conforms to a portion of the outer circumference of the pontoon 112 and holds the pontoon 112 in place.

Figure 5:
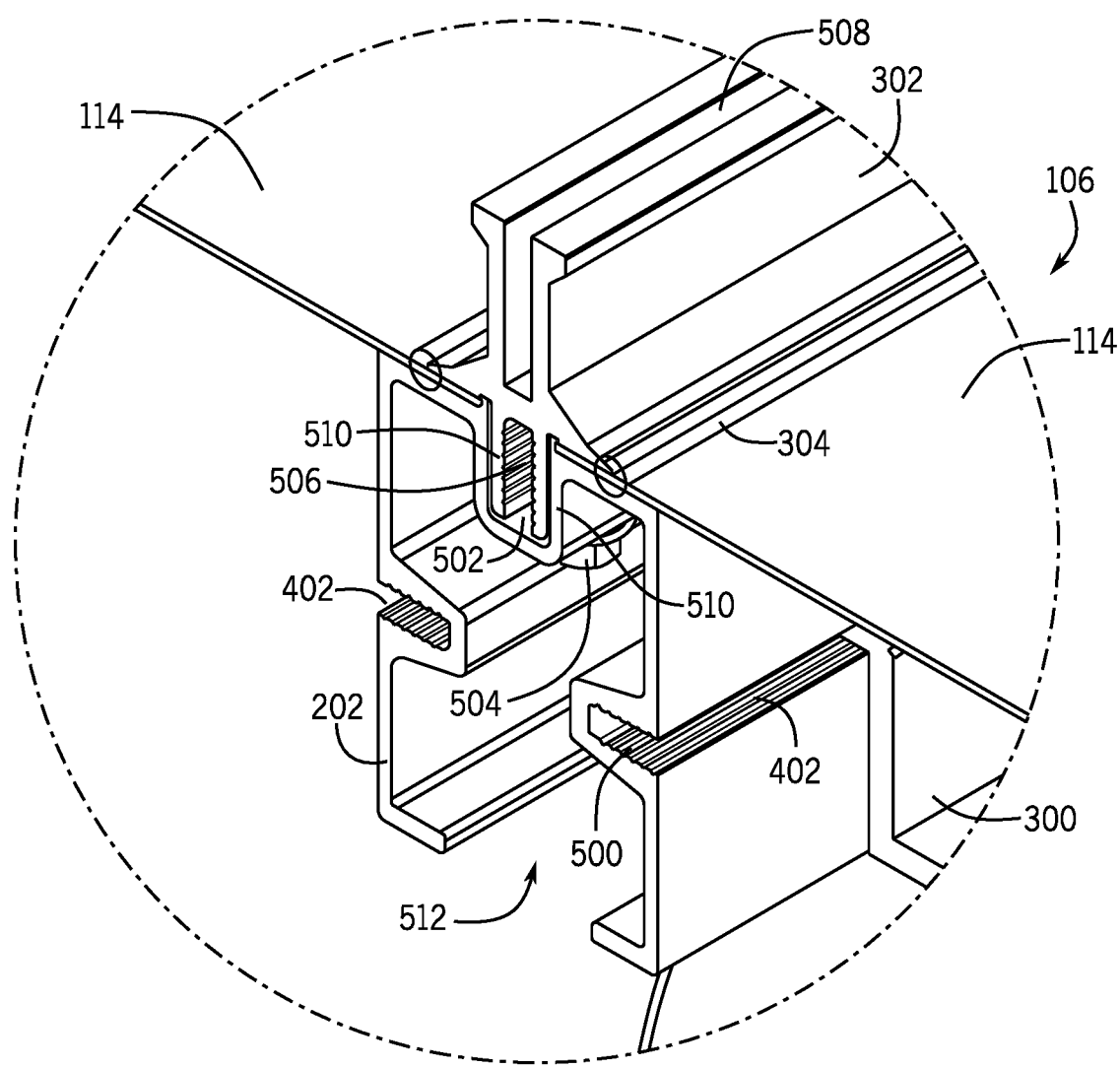
FIG. 5 is a detail perspective section view of the floating roof, taken within line 5-5 of FIG. 3, in accordance with an embodiment of the present disclosure.

FIG. 5 is a detail perspective section view of the floating roof 106, taken within line 5-5 of FIG. 3. As shown, the girder 202 has side channels 402 on opposite sides of the girder 202. In some embodiments, sidewalls 500 of the side channels 402 may have teeth configured to interface with the threads of a bolt, such that components (e.g., bracket 300) may be coupled to the girder 202. In other embodiments, the side channels 402 may be configured to be self-tapping. That is, the material of the sidewalls 500 may be malleable, such that the threads of the bolt dig into the sidewalls 500 to hold the bolt in place. The top of the girder 202 includes a top channel 502 having a generally rectangular cross-section. The top channel 502 may include multiple bolt holes (e.g., apertures) along the length of the girder 202 configured to receive a respective bolt 504. The cap channel 302 includes a bottom channel 506 and a top channel 508. The bottom channel 502 is defined on either side by legs 510. The legs 510 are configured to fit within the top channel 502 of the girder 500, such that the bottom channel 506 of the cap channel 302 faces the top channel 502 of the girder 202. The bolt 504 extends through the aperture in the top channel 502 and interfaces with the interior surfaces of the legs 510. As with the sidewalls 500 of the girder 202, the interior surfaces of the legs 510 of the cap channel may have teeth configured to interface with the threads of a bolt 504, or the interior surfaces of the legs 510 may be self-tapping. As the bolt 504 is tightened, the cap channel 302 is brought further and further into the top channel 502 of the girder 202, capturing the deck sheets 114 against the top surface of the girder 202. A weld bead 304 may be formed at the interface of the deck sheets 114 and the cap channel 302. A bottom channel 512 of the girder 202 is generally open to provide access to the bolt 504.

Figure 6:
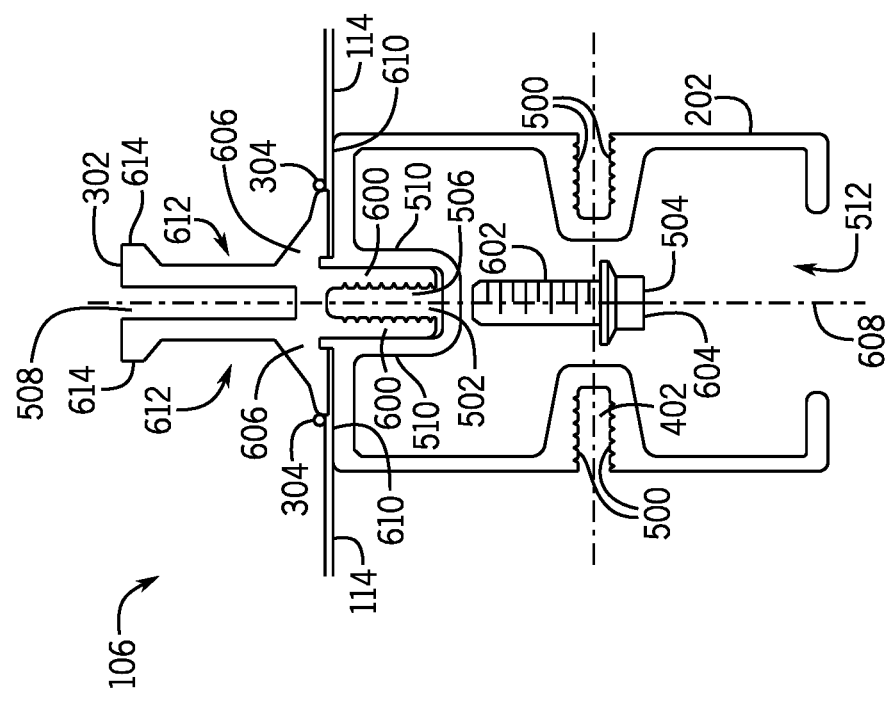
FIG. 6 is a side section view of an interface between a girder, a cap channel, and deck sheets, in accordance with an embodiment of the present disclosure.

FIG. 6 is a side section view of the interface between the girder 202, the cap channel 302, and the deck sheets 114. As shown, the bottom channel 506 of the cap channel 302 is defined by legs 600. The interior surface of each leg 600 may include teeth configured to interface with threads 602 of the bolt 504. The bolt 504 extends through an aperture in the girder 202 and into the top channel 502 of the girder 202. The legs 600 of the cap channel 302 are inserted into the top channel 502 of the girder 202 such that the threads 602 of the bolt 504 interface with the legs 600 of the cap channel 302. As the bolt 504 is tightened (e.g., by rotating a head 604 of the bolt 504), the threads 602 engage the legs 600 of the cap channel 302 and pull the cap channel 302 further into the top channel 502 of the girder 202. The head 604 of the bolt 504 is accessible via the open bottom channel 512 of the girder 202. As the cap channel 302 is drawn into the top channel 502 of the girder 202, feet 606 of the cap channel 302, which extend outward from a central or vertical plane 608 of the cap channel 302, capture the adjacent deck sheets 114 against the top surface 610 of the girder 202, thereby holding the deck sheets 114 in place. As previously described, the cap channel 302 includes the top channel 508. The cap channel 302 also includes roller recesses 612 on either side of the cap channel 302, which are configured to interface with rollers of a welding machine to couple the welding machine to the cap channel 302 and/or guide an automatic welding machine relative to the cap channel 302. Protrusions 614 extend outward, opposite the roller recesses 612 from the arms 606, and run the length of the cap channel 302 to keep the rollers of the welding machine engaged with the roller recesses 612. The welding machine traverses the length of the cap channel 302 laying weld beads 304 on either side of the cap channel 302 at the interface of the feet 606 and the deck sheets 114. In some embodiments, the welding machine may traverse the cap channel 302 a first time to lay one weld bead 304, and then traverse the cap channel 302 a second time to lay a second weld bead 304. In other embodiments, the welding machine may lay both weld beads 304 on opposite sides of the cap channel 302 while traversing the cap channel 302 a single time.

Figure 7:
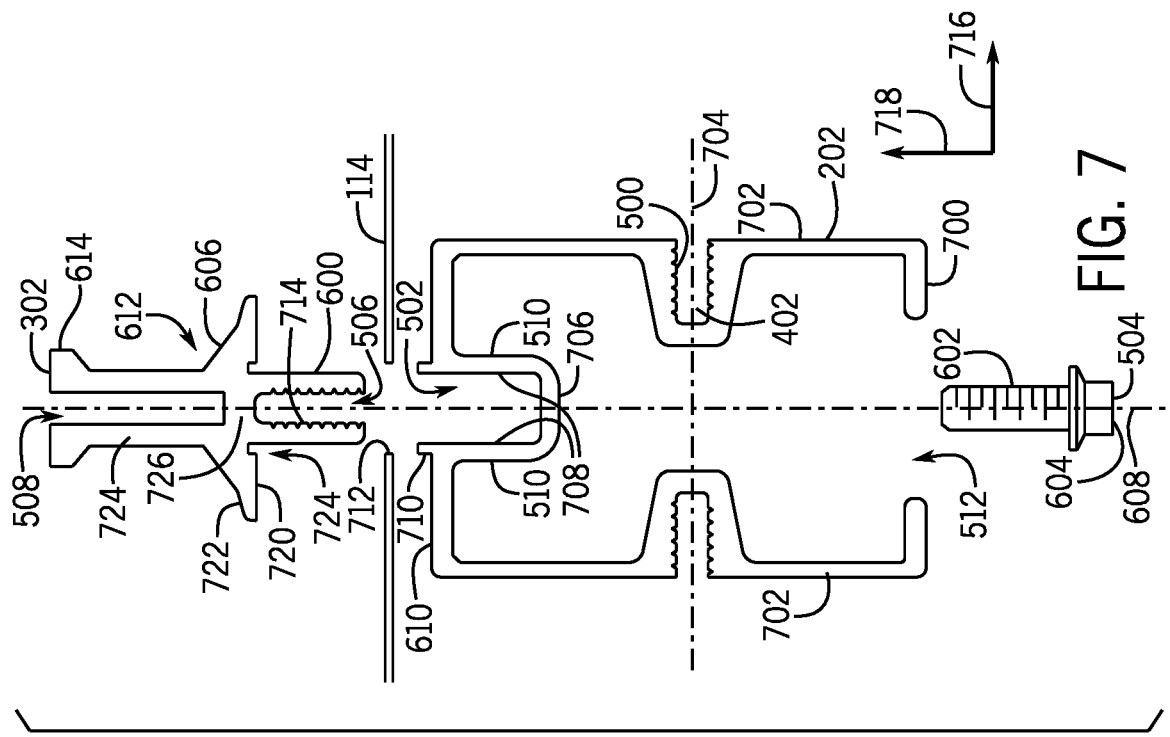
FIG. 7 is an exploded side section view of the interface between the girder, the cap channel, and the deck sheets shown in FIG. 6, in accordance with an embodiment of the present disclosure.

FIG. 7 is an exploded side section view of the girder 202, the cap channel 302, and the deck sheets 114 shown in FIG. 6. As shown, the girder 202 has a generally open profile. That is, the bottom channel 512 in a bottom surface 700 of the girder 202 provides access to the interior of the girder 202 (e.g., to tighten or loosen the bolt 504). The girder 202 may include side channels 402 extending inward from respective side surfaces 702 of the girder 202. In the illustrated embodiment, the side channels 402 have a generally rectangular in shape. The side channels 402 are closed in that they do not provide access to the interior of the girder 202. In other embodiments, the side channels 402 may have an inward or outward taper. The side channels 402 are defined on either side by sidewalls 500. The sidewalls 500 may have grooves or teeth configured to interface with the threads 602 of a bolt 504 for installation of one or more brackets. In other embodiments, the sidewalls 500 may be made of a malleable material that enables the threads 602 of a bolt 504 to engage with the side walls 500 (e.g., self-tapping) as the bolt 504 is installed. In the illustrated embodiment, the side channels 402 extend along a central horizontal plane 704 of the girder 202. In other embodiments, the side channels 402 may be disposed on either side (e.g., above or below) the central horizontal plane 704 of the girder 202. The top channel 502 is generally rectangular in shape and extends inward from the top surface 610 of the girder 202. The top channel 502 is defined by the legs 510 on either side of the top channel 502 and the bottom 706, which extends between the legs 510, closing the top channel 502. As with the side channels 402, the top channel 502 is closed in that it does not provide access to the interior of the girder 202. The top channel 502 is generally centered on and extends along the vertical central plane 608 of the girder 202. In the illustrated embodiment, the interior surfaces 708 of the legs 510 are smooth (e.g., the interior surfaces 708 of the legs 510 do not have teeth). In the illustrated embodiment, the girder includes protrusions 710 extending on either side of the top channel 502, extending outward, perpendicular to the top surface 610. Each protrusion 710 and respective top surface provide a corner in which the deck sheet 114 may fit. That is, an edge 712 of the deck sheet 114 may butt up against the protrusion 710. The girder 202 may be made of an extruded metal, such as aluminum. However, in other embodiments, the girder 202 may be fabricated from other metals (e.g., steel, stainless steel, iron, copper, titanium, brass, etc.) or other classes of materials, such as polymers. Further, other fabrication techniques, such as molding, machining, casting, 3D printing, etc., or a combination thereof may be used to fabricate the girder 202.

The cap channel 302 includes legs 600, which define the bottom channel 506. The interior surfaces 714 of the legs 600 may include teeth, grooves, or texturing configured to interface with the threads 602 of the bolt 504. In other embodiments, the legs 600 may be made of a sufficiently soft material that the threads 602 of the bolt 504 engage with the side walls 714 (e.g., self-tapping) as the bolt 504 is installed. The feet 606 may extend outward in a first direction 716 from the cap channel 302. The bottom surface 720 of each foot may be generally parallel to the horizontal central plane 704, as well as the top surface 610 of the girder 202. In the illustrated embodiment, the top surface 722 of each foot 607 extends diagonally downward, oblique to the central horizontal plane 704. However, in other embodiments, the top surface 722 may extend outward in the first direction 716, substantially parallel to the central horizontal plane 704. As shown, the cap channel 302 may include a recess 724 where the bottom surface 720 of the foot 606 and the legs 600 meet, running the length of the cap channel 302. In some embodiments, the recess 724 may be configured to receive the protrusion 710 of the girder 202 when the cap channel 302 is installed on the girder 202. As previously discussed, in an installed configuration, the deck sheet 114 is sandwiched between the top surface 610 of the girder 202 and the bottom surface 720 of the foot 606 of the cap channel 302. In some embodiments, the top surface 610 of the girder 202, the bottom surface 720 of the cap channel 302, or both, may include teeth, grooves, knurling, texturing, etc. to improve grip and increase friction with the deck sheet 114. Similarly, in some embodiments, the deck sheet 114 may include a textured finish to increase friction at the interface between the deck sheet 114, the girder 202, and the cap channel 302. The cap channel 302 includes the top channel 508, which is substantially rectangular in shape and defined by arms 724. A central rib 726 acts as the top of the bottom channel 506 and the bottom of the top channel 508.

The arms 724 include protrusions 614 that extend outward, away from the central vertical plane 604. The protrusions 614 define roller recesses 612 on either side of the cap channel, which are configured to interface with rollers of a welding machine to couple the welding machine to the cap channel 302. The protrusions 614 and roller recesses 612 run the length of the cap channel 302 to keep the rollers of the welding machine engaged with the roller recesses 612. The welding machine traverses the length of the cap channel 302, laying weld beads 304 on either side of the cap channel 302, at the interface of the feet 606 and the deck sheets 114. In some embodiments, the welding machine may traverse the cap channel 302 a first time to lay one weld bead 304, and then traverse the cap channel 302 a second time to lay the second weld bead 304. In other embodiments, the welding machine may lay both weld beads 304 while traversing the cap channel 302 a single time. As with the girder 202, the cap channel 302 may be made of an extruded metal, such as aluminum. However, in other embodiments, the cap channel 302 may be fabricated from other metals (e.g., steel, stainless steel, iron, copper, titanium, brass, etc.), or other classes of materials, such as polymers. Further, other fabrication techniques, such as molding, machining, casting, 3D printing, etc., or a combination thereof may be used to fabricate the cap channel 302. Further, the girder 202 and the cap channel 302 may or may not be manufactured by the same material and/or by the same or similar processes.

Figure 8:
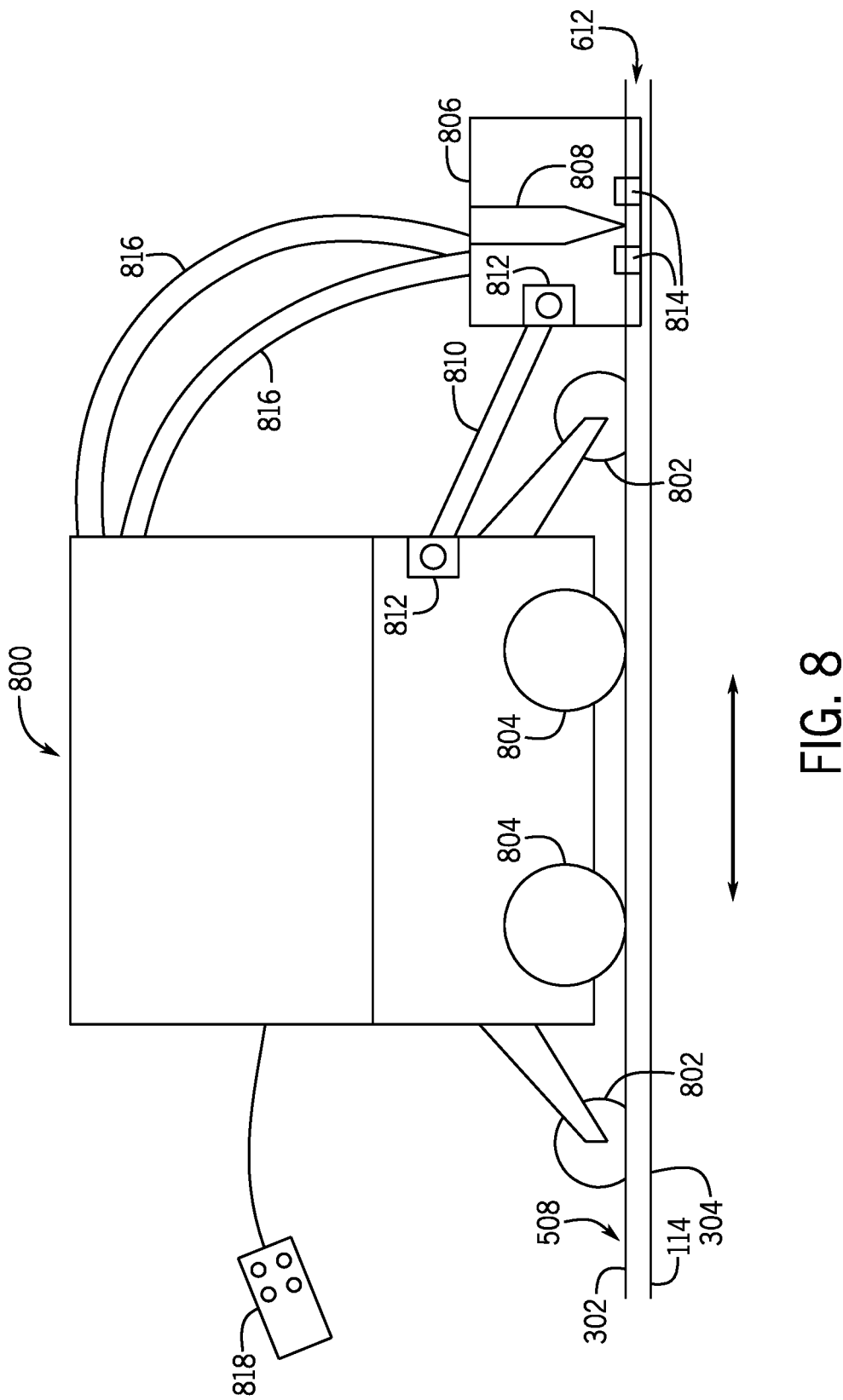
FIG. 8 is a side view of a welding machine traversing the cap channel, welding the deck sheet to the cap channel, in accordance with an embodiment of the present disclosure.

FIG. 8 is a side view of a welding machine 800 traversing the cap channel 320, welding (e.g., laying the weld bead 304) the deck sheet 114 to the cap channel 302. As shown, the welding machine 800 may include guide wheels 802 configured to fit inside, and roll along, the top channel 508 of the cap channel 302. The welding machine 800 may also include drive wheels 804, which may contact the cap channel 302 and/or the deck sheets 114 and propel the machine 800 along the cap channel 302. In the illustrated embodiment, the welding machine 800 includes a trolley 806, which may include one or more welding torches 808 configured to weld the deck sheet 114 to the cap channel 302. The trolley 806 may be coupled to the welding machine 800 via a rod 810 that couples to each of the welding machine 800 and the trolley 806 via a ball and socket interface 812. The trolley 806 also includes one or more rollers 814 configured to couple to the cap channel 302 by fitting into the roller recesses 612. One or more weld cables 816 may extend from the welding machine 800 to the welding torches 808 on the trolley to provide power and welding consumables (e.g., wire, shielding gas, etc.) for the welding operation. In alternative embodiments, the welding machine 800 may position the one or more welding torches 808 without the use of the trolley 806. In some embodiments, the welding machine 800 may include a pendant 818 by which an operator may control the operation of the welding machine 800. In some embodiments, the welding machine 800 may traverse the cap channel 302 a first time to lay one weld bead 304, and then traverse the cap channel 302 a second time to lay the second weld bead 304. In other embodiments, the welding machine may lay both weld beads 304 while traversing the cap channel 302 a single time.

Figure 9:
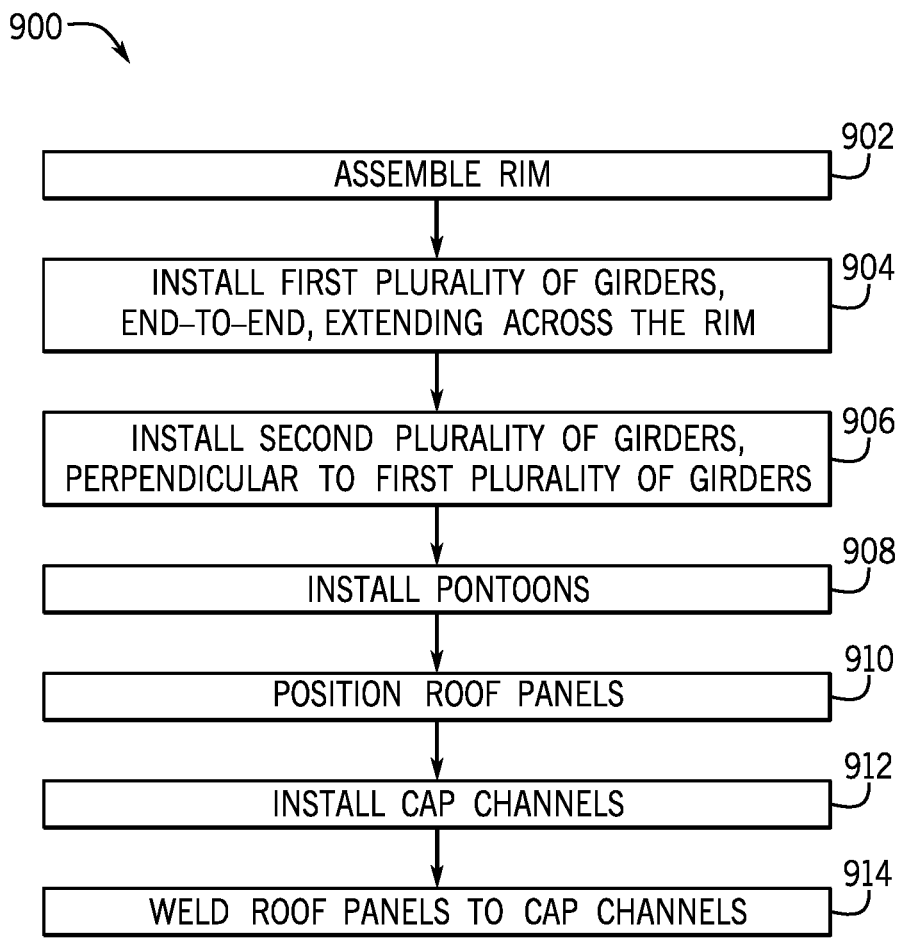
FIG. 9 is a flow chart of a process for assembling the floating roof of FIG. 2, in accordance with an embodiment of the present disclosure.

FIG. 9 is a flow chart of a process 900 for assembling an internal floating roof. At block 902, the rim is assembled. The rim may include, for example, one or more members (e.g., extruded aluminum support members) coupled to one another and forming the outer circumference of the floating roof. At block 904, a first plurality of girders are installed. The first plurality of girders may be divided into sets and arranged end-to-end, spanning across the rim in a first direction forming substantially parallel lengths of girders spanning across the rim. At block 906, second plurality of girders may be arranged in a second direction, perpendicular to the first direction, and offset from one another, spanning between adjacent sets of the first plurality of girders. As previously described, brackets may be utilized to couple the girders to one another. Though in the instant embodiment, the first and second plurality of girders combine to form a grid-like pattern of girders, in other embodiments, the girders may be arranged to form other shapes, or according to a different topology.

At block 908 the pontoons are installed. Specifically, pontoons may be coupled to the rim and/or to the girders. For example, a first plurality of pontoons may be disposed end to end circumferentially about the interior of the rim. A second plurality of pontoons may be coupled to the girders. The second plurality of pontoons may be generally aligned with the second direction and arranged offset from one another in the first direction such that the ends of adjacent pontoons overlap with one another.

At block 910, the deck sheets are positioned. As discussed with regard to FIG. 7, the top of each girder may include a protrusion extending up from the top surface of the girder, forming a corner in which the deck sheet may sit, butted up against the protrusion. At block 912, the cap channels may be installed. Specifically, the legs of each cap channel may be inserted into the top channel of the respective girder. One or more bolts may extend up through apertures in the bottom of the top channel of the girder and into the bottom channel of the cap channel. The threads of the bolt may interface with the interior surfaces of the legs of the cap channel such that as the bolt is tightened, it pulls the cap channel closer to the girder, sandwiching the deck sheets between the top surface of the girder and the bottom surface of the feet of the cap channel 302, thus holding the deck sheets in place.

At block 914, the deck sheets are welded to the cap channels. As previously described, the welding machine may engage with the roller recesses of the cap channel to position the welding machine and guide it along the cap channel. The welding machine then traverses the cap channel, welding the deck sheet to the cap channel. In some embodiments, the welding machine may traverse the cap channel a first time to lay one weld bead, and then traverse the cap channel a second time to lay the second weld bead. In other embodiments, the welding machine may lay both weld beads while traversing the cap channel a single time.

The disclosed techniques include an internal floating roof for a storage tank having welded deck seems. The internal floating roof includes a rim and a plurality of girders coupled to one another in a pattern interior of the rim. A plurality of pontoons may be coupled to the girders to provide buoyancy for the internal floating roof, enabling the internal floating roof to float on the surface of the product in the storage tank. A plurality of deck sheets may be positioned on top of the girders such that the edges of the deck sheets extend substantially parallel to a top channel of respective girders. A cap channel may be inserted into the top channel of each of the respective girders and secured via one or more bolts. The cap channel includes feet that contact the edges of the deck sheets, sandwiching the deck sheets between the feet of the cap channel and the top surface of the respective girder. A welding machine may then engage with the cap channel to align itself, and weld the deck sheet to the cap channel. The welded seam creates a partially, substantially, or completely fluid-tight and/or air-tight seal that restricts the flow of product or product vapor through the floating roof, thus reducing product emissions across the floating roof.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An internal floating roof for a storage tank, comprising:
a rim;
a first plurality of girders extending in a first direction across the rim, wherein the first plurality of girders comprises a first girder, wherein the first girder comprises a first top channel;
a second plurality of girders extending in a second direction, cross-wise to the first direction; wherein the second plurality comprises a second girder, wherein the second girder comprises a second top channel;
a deck sheet disposed on a first top surface of the first girder and a second top surface of the second girder;
a first cap channel coupled to the first top channel of the first girder, wherein the first cap channel comprises:
a first foot configured to press a first edge of the deck sheet against the first top surface of the first girder, wherein the first foot is welded to the deck sheet along a first length of the first cap channel; and
first and second legs defining a first bottom channel, wherein the first and second legs are configured to be inserted into the first top channel of the first girder and configured to engage with a first fastener extending into the first top channel to bias the first cap channel against the first girder;
a second cap channel coupled to a second top channel of the second girder, wherein the second cap channel comprises:
a second foot configured to press a second edge of the deck sheet against the second top surface of the second girder, wherein the second foot is welded to the deck sheet along a second length of the second cap channel; and
third and fourth legs defining a second bottom channel, wherein the third and fourth legs are configured to be inserted into the second top channel of the second girder and configured to engage with a second fastener extending into the second top channel to bias the second cap channel against the second girder; and
a pontoon coupled to the first girder.

2. The internal floating roof of claim 1, wherein the first and second girders each comprise extruded aluminum.

3. The internal floating roof of claim 2, wherein the first and second girders each comprise an open profile.

4. The internal floating roof of claim 2, wherein each of the first and the second girders comprise first and second side channels.

5. The internal floating roof of claim 4, wherein first and second girders are coupled to one another via an L-shaped bracket coupled to the first side channel or the second side channel of each of the first and the second girders.

6. The internal floating roof of claim 1, wherein the first and second cap channels comprise first and second lengths of extruded aluminum.

7. The internal floating roof of claim 1, wherein the first and second cap channel each comprise first and second arms comprising first and second protrusions, wherein the first in second arms define a first roller recess, a second roller recess, and a guide wheel channel.

8. The internal floating roof of claim 1, wherein the pontoon is coupled to the first girder via a pontoon strap.

9. A system, comprising:
  a girder comprising a first top channel extending in a first direction inward from a top surface of the girder and extending in a second direction along a first length of the girder;
  a first deck sheet disposed on the top surface of the girder and on a first side of the first top channel;
  a second deck sheet disposed on the top surface of the girder and on a second side of the first top channel; and
  a cap channel comprising:
    a first leg and a second leg, wherein the first and second legs define a bottom channel;
    a first foot configured to capture the first deck sheet against the top surface of the girder, wherein the first foot is welded to the first deck sheet;
    a second foot configured to capture the second deck sheet against the top surface of the girder, wherein the second foot is welded to the second deck sheet; and
    a first arm and a second arm, wherein the first and second arms define a first roller recess, a second roller recess, and a second top channel;
  wherein the first and second legs are configured to be inserted into the first top channel of the girder and to receive a fastener extending into the first top channel to bias the cap channel against the girder.

10. The system of claim 9, wherein the cap channel is configured to interface with a welding machine to weld the first foot to the first deck sheet and weld the second foot to the second deck sheet.

11. The system of claim 10, wherein the first and second roller recesses are configured to receive first and second rollers of the welding machine to hold the welding machine in place relative to the cap channel.

12. The system of claim 10, wherein the second top channel is configured to receive a guide wheel of the welding machine.

13. The system of claim 9, wherein first and second legs comprise respective first and second interior surfaces comprising teeth configured to engage with a threaded surface of the fastener.

14. The system of claim 9, wherein the girder and the cap channel comprise extruded aluminum.

15. The system of claim 14, wherein the girder comprises an open profile.

* * * * *